United States Patent [19]

Hartmann et al.

[11] Patent Number: 4,521,384

[45] Date of Patent: Jun. 4, 1985

[54] PROCESS FOR THE PRODUCTION OF NEARLY ALUMINIUM CHLORIDE-FREE TITANIUM TETRACHLORIDE FROM TITANIFEROUS RAW MATERIALS CONTAINING ALUMINUM COMPOUNDS

[75] Inventors: Achim Hartmann, Pulheim; Hans Thumm, Leverkusen, both of Fed. Rep. of Germany

[73] Assignee: Kronos Titan - G.m.b.H., Leverkusen, Fed. Rep. of Germany

[21] Appl. No.: 416,262

[22] Filed: Sep. 9, 1982

[30] Foreign Application Priority Data

Sep. 12, 1981 [DE] Fed. Rep. of Germany ....... 3136289

[51] Int. Cl.³ .............................................. C22B 1/08
[52] U.S. Cl. ...................................... 423/72; 423/74; 423/76; 75/1 T
[58] Field of Search ....................... 423/72, 74, 76, 77, 423/79, 84, 116, 119–121, 126, 136, 137, 133, 463; 75/1 T

[56] References Cited

U.S. PATENT DOCUMENTS

| | | | |
|---|---|---|---|
| 3,262,754 | 7/1966 | Lindsay et al. | 423/133 |
| 3,786,135 | 1/1974 | King et al. | 423/463 |
| 3,793,003 | 2/1974 | Othmer | 423/135 |
| 3,853,541 | 12/1974 | Othmer | 423/135 |
| 3,977,864 | 8/1976 | Glaeser | 75/1 T |
| 4,017,304 | 4/1977 | Glaeser | 423/76 |
| 4,331,645 | 5/1982 | Dunn, Jr. | 423/463 |
| 4,349,516 | 9/1982 | Dunn, Jr. | 423/463 |
| 4,385,964 | 5/1983 | Johnson et al. | 423/463 |

Primary Examiner—L. Dewayne Rutledge
Assistant Examiner—S. Kastler
Attorney, Agent, or Firm—Burns, Doane, Swecker & Mathis

[57] ABSTRACT

Process for the production of a nearly aluminum chloride-free titanium tetrachloride from titaniferous raw materials containing larger quantities of aluminum compounds in a fluid bed with the addition of a reducing agent. In the process, sodium chloride is added to or formed in the reaction mixture before the first condensation step. A sodium chloride/aluminum chloride complex is formed thereby, which is discharged together with the chloride mixture and separated from said mixture together with the metal chlorides of lower volatility. The maximum quantity of NaCl needed is 1 mole per mole Al contained in the titaniferous raw material and per mole of iron (III) chloride, calculated as $FeCl_3$, that may form.

8 Claims, 1 Drawing Figure

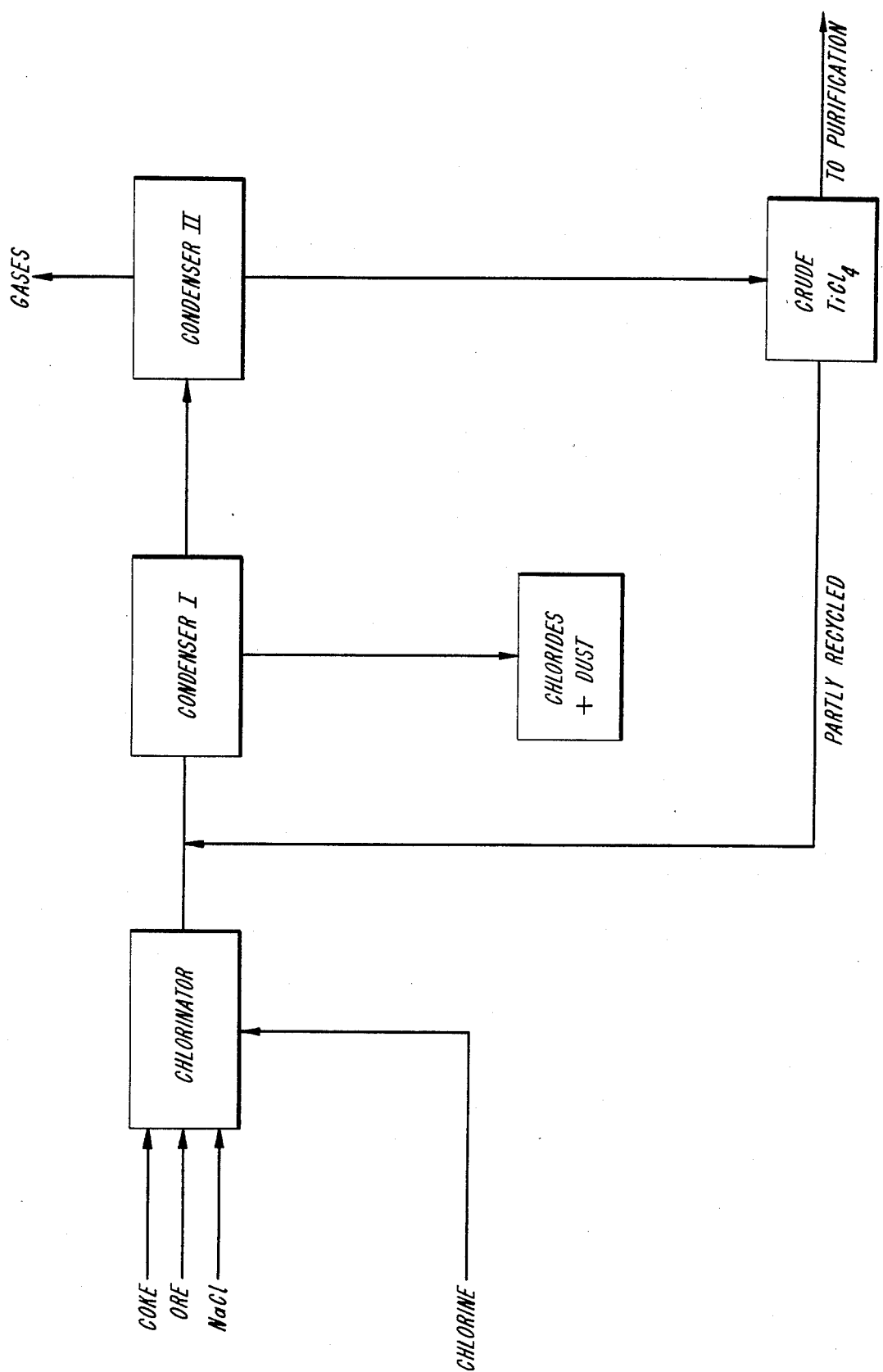

PROCESS FOR THE PRODUCTION OF NEARLY ALUMINIUM CHLORIDE-FREE TITANIUM TETRACHLORIDE FROM TITANIFEROUS RAW MATERIALS CONTAINING ALUMINUM COMPOUNDS

BACKGROUND OF THE INVENTION

The invention concerns a process for the production of a titanium tetrachloride, which is nearly free from aluminum chloride, from titaniferous raw materials containing aluminum compounds by chlorinating a fine-sized titaniferous raw material in a fluid bed with the addition of a reducing agent, in which process the aluminum chloride formed in chlorination is bound with sodium chloride in a complex to be separated from the titanium tetrachloride in the form of this complex.

The base materials used for the production of titanium tetrachloride are titaniferous ores like rutile and ilmenite or other substances rich in titanium produced from such ores by enrichment of their titanium content, as e.g. in slags and concentrates. This base material is hereinafter referred to as "titaniferous raw material". The titaniferous raw materials contain compounds of other metals, e.g. aluminum. Among them there are titaniferous raw materials which contain substantial quantities of aluminum, e.g. 1 to 2% calculated as $Al_2O_3$. On chlorination, these metal compounds are converted into their corresponding chlorides, which leave the chlorinator together with the titanium tetrachloride generated. These chlorides are then either collected by condensation together with at least part of the titanium tetrachloride, or the chlorides of lower volatility are removed in a first step before, in a second step, the crude titanium tetrachloride substantially freed from these chlorides of lower volatility is liquefied together with other chlorides of higher volatility.

"Chlorides of lower volatility" are here and further below understood to mean those metal chlorides whose boiling or sublimation point is higher than the boiling point of titanium tetrachloride under comparable pressure conditions, whereas "chlorides of higher volatility" are to mean those metal chlorides whose boiling point or point of sublimation is lower than the boiling point of titanium tetrachloride under comparable pressure conditions.

No problems are generally incurred when separating the chlorides of iron and zirconium from the titanium tetrachloride because their vapor pressure is relatively low, whereas the presence of aluminum chloride in titanium tetrachloride will cause difficulties if its quantity exceeds the quantity soluble in the titanium tetrachloride.

Owing to its relatively high vapor pressure, the aluminum chloride is carried along with the titanium tetrachloride at considerable quantities and separates from the vaporous and liquid titanium tetrachloride in a solid form as the titanium tetrachloride vapor is cooled, condensed and cooled further down, as soon as its solubility in titanium tetrachloride is exceeded. Since this solubility is considerably influenced by the prevailing termperature, aluminum chloride deposition will occur in all temperature ranges and the deposits coat the heat exchange surfaces of the cooling and condensing equipment, thus interfering with heat removal or plugging the pipelines. The aluminum chloride in the crude liquid titanium tetrachloride, moreover, has a highly corrosive effect on the customarily used metal surfaces of the equipment.

PERTINENT ART

There are several procedures known for the separation of the aluminum chloride from the chloride mixture containing titanium tetrachloride, in which procedures the aluminum chloride is combined with alkali chlorides to form a complex.

According to the published German application DE-OS No. 29 02 098, the liquid chloride mixture is treated with water and sodium chloride, in which process the two additives are adapted in quantity to the quantity of the aluminum chloride present.

According to U.S. Pat. No. 3,066,010, the gaseous chloride mixture is contacted with solid sodium chloride in a column, from which not only the chloride vapor freed from the aluminum chloride is withdrawn but also a melt formed by sodium chloride together with the aluminium chloride contained in the chloride mixture and, if present, iron (III) chloride. Further, the gaseous chloride mixture can be first freed from solid particles in a separate step or the column does not only contain an alkali chloride but also a carbonaceous material.

Disadvantage of the process of the German patent application DE-OS No. 29 02 098 is not only that it does not eliminate the problems occurring in the condensation of the chloride mixture but that it also presents metering problems since the two additives must not only be balanced with the quantity of aluminum chloride formed but also with each other. The aluminum chloride is bound relatively slowly, and the quantity of sodium chloride needed is very high.

The other known methods require additional equiment and are complicated in their set-up. The separation of the liquid complex from the unreacted alkali chloride is not simple and the column easily clogs up.

DETAILED DESCRIPTION OF THE INVENTION

A new process has now been found in which a titanium tetrachloride nearly free from aluminum chloride can be produced from titaniferous raw materials containing aluminum compounds by chlorinating a fine-sized titaniferous raw material in a fluid bed with the addition of a reducing agent, in which process the aluminum chloride formed on chlorination is bound with sodium chloride in a complex to be separated from the titanium tetrachloride in the form of such complex. The process is characterized in that the sodium chloride is added to or formed in the reaction mixture before the first step of condensation of the emerging chloride mixture and that the quantity of sodium chloride needed to combine with the aluminum chloride is a maximum of 1 mole NaCl per mole Al contained in the titaniferous raw material and that the complex formed by the sodium chloride and the aluminum chloride is discharged together with the chloride mixture.

"Nearly free from aluminum chloride" means to say that the titanium tetrachloride produced contains less aluminum chloride than would correspond to its solubility in the titanium tetrachloride at room temperature, in other words not more than 0.07 percent by weight aluminum chloride must be contained in the titanium tetrachloride. The process of the invention does not only permit this low aluminum chloride content to be reached but permits it to be reduced easily still further to a percentage as low as about 0.04% by weight.

"Chloride mixture" is understood to mean the mixture of gases produced in chlorination and usually containing unreacted or other newly formed gases, as e.g. carbon dioxide or nitrogen, in addition to the metal chlorides formed.

The process will be more fully understood with reference to the sole FIGURE that illustrates the process. Referring now to the drawing, sodium chloride is added preferably in the solid state either together with one of the constituents making up the fluid bed or separately into the chlorinator. It can, however, be added outside the chlorinator but before the point where metal chlorides are for the first time separated from the chloride mixture by condensation, i.e. before Condenser I. The sodium chloride may also be generated from other sodium compounds inside the chlorinator, such as sodium carbonate. The chlorinator contains a fluid bed of the titaniferous ore containing aluminum and coke established by a gas containing chlorine. In the chlorinator the aluminum chloride, together with the added or generated sodium chloride forms a complex, which mainly consists of sodium tetrachloroaluminate ($NaAlCl_4$). This complex is of lower volatility than the aluminum chloride as such. Owing to its low volatility, it is easier to separate from the titanium tetrachloride than aluminum chloride. In addition to the raw materials and the reducing agent, the fluid bed contains small amounts of unreacted metal oxides. The reaction products formed are volatile chlorides which leave the chlorinator together with small amounts of carbon monoxide, carbon dioxide, hydrogen chloride and nitrogen in their gaseous form.

The aluminum chloride contained in the chloride mixture is removed from the crude titanium tetrachloride before the latter is condensed. The complex is formed at much higher temperatures and much faster than in known processes and the quantity of sodium chloride needed is much smaller, see German application DE-05 No. 29 02 098.

In contrast to the known processes, in which the complex is formed at the same time as its condensation takes place and as other metal chlorides of lower volatility are condensed, while solid sodium chloride is present, sodium chloride is, in the present invention, added or generated before the first condensation step and the reaction mixture containing the complex formed, as well as the other metal chlorides of lower volatility, is carried along, substantially in the gaseous form. The reaction mixture is passed through a first condensation step where the complex, together with the metal chlorides of low volatility, are condensed and removed. From this first condensation step, the reaction mixture, now nearly free of aluminum chloride, is passed to a second condensation step where the titanium tetrachloride is condensed.

Also unlike the known methods, the present method needs very little sodium chloride; moreover, it does without the separation of the liquid complex formed from the excess of solid sodium chloride required in the known processes and necessitating some technically complicated installations.

Since iron (III) chloride forms complexes with sodium chloride in a similar manner as aluminum chloride does, correspondingly more sodium chloride must be added in case iron (III) chloride is present or formed in the reaction mixture. As too high a sodium chloride consumption should be avoided, it is generally recommended to prevent the generation of larger quantities of iron (III) chloride in the chlorination of titaniferous raw materials.

The reducing agent used in chlorination may be solid, e.g. coke, or gaseous, e.g. carbon monoxide; solid reducing agents, particularly carbonaceous ones, e.g. petrol coke, are preferred.

A preferred embodiment of the invented process is characterized in that a. chlorination is carried out at 800°–1200° C. in such a manner that no substantial quantities of iron (III) chloride are formed and that, in addition to the sodium chloride needed to bind the aluminum chloride, 1 mole NaCl is added or generated in the reaction mixture per mole iron (III) chloride formed, calculated as $FeCl_3$, and that, c. in a manner known as such, the chlorides of lower volatility are removed from the chloride mixture produced in a first condensation step and that the titanium tetrachloride and the chlorides of higher volatility are subsequently liquefied in a second condensation step.

This mode of operation permits the complex of sodium chloride and aluminum chloride, together with the metal chlorides of lower volatility (including e.g. chlorides of Fe, Mn, Mg, Ca, Zr, Nb), to be removed almost quantitatively from the gaseous titanium tetrachloride and the chlorides of higher volatility in a first condensation step and subsequently the titanium tetrachloride to be liquefied together with the chlorides of higher volatility (particularly $SiCl_4$, $SnCl_4$) in a second condensation step. Preferred temperature ranges for the first condensation step are 140°–145° C. and for the second condensation step are 60°–65° C.

Chlorination should, as a rule, take place in a certain temperature range, i.e. 800° to 1200° C. If the temperature falls below the lower limit, sodium chloride tends to accumulate in the fluid bed and cause the particles of the bed to stick together. If the upper temperature limit is exceeded, the fluid bed may start to sinter together. The preferred chlorination temperature ranges between 850° and 1100° C.

The sodium chloride may be introduced into the chlorinator or the adjoining parts of the equipment at any point before the first condensation step. In a preferred embodiment of the invention, the sodium chloride is added to the fluid bed. It may, for instance, be introduced into the chlorinator together with one of the constituents forming the fluid bed or separately introduced.

The following example is to explain the invention in more detail. The titaniferous raw material used was a slag produced from ilmenite at Richards Bay, South Africa, and showed the following analysis and particle size distribution:

| | Analysis | Particle size distribution (sieve analysis) | |
|---|---|---|---|
| | wt. % | mm | wt. % |
| $TiO_2$ | 85.6 | >0.25 | 33.2 |
| $Fe_2O_3$ | 10.7 | 0.1–0.25 | 66.1 |
| $Nb_2O_3$ | 0.14 | 0.063–0.1 | 0.6 |
| $ZrO_2$ | 0.23 | <0.063 | 0.1 |
| $MnO_2$ | 1.8 | | |
| CaO | 0.13 | | |
| MgO | 0.99 | | |
| $P_2O_5$ | <0.02 | | |
| $SiO_2$ | 2.5 | | |
| $Al_2O_3$ | 1.6 | | |

-continued

| Analysis | | Particle size distribution (sieve analysis) | |
|---|---|---|---|
| | wt. % | mm | wt. % |
| SnO$_3$ | 0.01 | | |
| V$_2$O$_5$ | 0.46 | | |

The reducing agent used was a coke of the following particle size distribution(sieve analysis):

| mm | wt. % |
|---|---|
| >2 | 0 |
| 1-2 | 2.5 |
| 0.5-1 | 88.0 |
| 0.25-0.5 | 9.0 |
| <0.25 | 0.5 |

A fluid bed was established using 80% by weight of the titaniferous raw material and 20% by weight of the coke and feeding this mixture continuously to the bed at a rate of 6,800 kg/h. 9,300 kg/h of a gas containing 88.2% by weight of chlorine were introduced into this fluid bed at a temperature of 1050° C. The remainder of the gas was carbon dioxide, oxygen, hydrogen chloride and nitrogen. 17,300 kg/h of a gaseous chloride mixture containing 12,000 kg/h metal chlorides were withdrawn from the chlorinator. This chloride mixture was first cooled to 140° C. in a first condensation step in order to condense the metal chlorides of lower volatility, i.e. chiefly iron (II) chloride, which were removed. The remaining gas mixture was then cooled further, in a second condensation step, to 60° C. whereby the titanium tetrachloride was liquefied together with the chlorides of higher volatility, and removed.

Owing to the high aluminum content of the raw material put in, large quantities of aluminum chloride were generated, which did not condense in the first condensation step but formed heavy deposits on the heat exchange surfaces of the second condensation step. The liquefied crude titanium tetrachloride contained 0.8% by weight aluminum chloride, most of which was present in the solid state in the liquid chlorides. Chlorination had to be interrupted after 50 hours as the pipelines were clogged and heat transfer in the coolers of the second condensation step had ceased. The crude titanium tetrachloride obtained was highly corrosive.

This procedure was then modified in such a manner that solid sodium chloride was fed to the chlorinator at a continuous rate of 35 kg/h while chlorination was in progress.

The heat exchange surfaces of the second condensation step now remained free from deposits, and the crude condensed liquid titanium tetrachloride did not contain solid aluminum chloride. The content of aluminum chloride in the crude titanium tetrachloride was no more than 0.04% by weight. It was possible to continue chlorination without interruption. Examination of the metal chlorides removed in the first condensation step showed that practically the entire quantity of aluminum was removed in the first condensation step, the crude titanium tetrachloride was no longer highly corrosive.

It is claimed:

1. A process for the production of a nearly aluminum chloride-free titanium tetrachloride comprising:
   (a) chlorinating in a fluidized bed and in the presence of a reducing agent a finely divided titaniferous raw material which is rich in titanium and which contains impurities including aluminum compounds to form a gaseous reaction mixture containing titanium tetrachloride, aluminum chloride and other impurities;
   (b) reacting the aluminum chloide with sodium chloride to form a complex;
   (c) subsequent to step (b), subjecting the gaseous reaction mixture containing titanium tetrachloride, aluminum chloride/sodium chloride complex and impurities to a first condensing step whereby aluminum chloride/sodium chloride complex and lower volatility impurities are condensed;
   (d) separating the condensate of step (c) from the gaseous reaction mixture;
   (e) subjecting the gaseous reaction mixture to a second condensing step whereby the titanium tetrachloride is condensed; and
   (f) recovering titanium tetrachloride which contains not more than 0.07% by weight aluminum chloride.

2. The process of claim 1 wherein the chlorination is conducted at a temperature of between 800° and 1200° C. such that essentially no iron (III) chloride is formed and wherein in addition to the sodium chloride required to react with the aluminum chloride, 1 mole of sodium chloride per mole of iron (III) chloride present in the reaction mixture, calculated as FeCl$_3$, is also present in the reaction mixture.

3. The process of claim 1 wherein the amount of sodium chloride is a maximum of 1 mole per mole of aluminum in the titaniferous raw material.

4. The process of claim 2 wherein sodium chloride is added to the fluidized bed.

5. The process of claim 1 wherein sodium chloride is added to the fluidized bed.

6. The process of claim 1 wherein the chlorination is conducted at a temperature of between 850° and 1100° C.

7. The process of claim 1 wherein the first condensing step is conducted at a temperature of between 140° and 145° C. and the second condensing step is conducted at a temperature of between 60° and 65° C.

8. The process of claim 1 wherein the recovered titanium tetrachloride contains not more than 0.04% by weight aluminum chloride.

* * * * *